United States Patent [19]

Asai

[11] 4,310,827
[45] Jan. 12, 1982

[54] DEVICE FOR EXTRACTING A DENSITY AS ONE OF PATTERN FEATURES FOR EACH FEATURE POINT OF A STREAKED PATTERN

[75] Inventor: Koh Asai, Tokyo, Japan

[73] Assignee: Nippon Electric Co., Ltd., Tokyo, Japan

[21] Appl. No.: 136,610

[22] Filed: Apr. 2, 1980

[30] Foreign Application Priority Data

Apr. 2, 1979 [JP] Japan .................................. 54-39648

[51] Int. Cl.³ .............................................. G06K 9/46
[52] U.S. Cl. .............................................. 340/146.3 E
[58] Field of Search .............. 340/146.3 E, 146.3 AC, 340/146.3 AE; 356/71; 250/567, 568; 364/515

[56] References Cited

U.S. PATENT DOCUMENTS

| | | | |
|---|---|---|---|
| 3,582,889 | 6/1971 | Bodez | 340/146.3 E |
| 3,959,884 | 6/1976 | Jordan et al. | 340/146.3 E |
| 4,015,240 | 3/1977 | Swonger et al. | 340/146.3 AC |
| 4,047,154 | 9/1977 | Vitols et al. | 340/146.3 E |
| 4,083,035 | 4/1978 | Riganati et al. | 340/146.3 E |
| 4,135,147 | 1/1979 | Riganati et al. | 340/146.3 E |
| 4,156,230 | 5/1979 | Riganati et al. | 340/146.3 E |
| 4,185,270 | 1/1980 | Fischer et al. | 340/146.3 E |
| 4,227,805 | 10/1980 | Schiller | 356/71 |

OTHER PUBLICATIONS

Rao et al., "An Automatic Fingerprint Classification System", *2nd Int. Joint Congress on Pattern Rec.*, Aug. 1974, pp. 180–184.

*Primary Examiner*—Leo H. Boudreau
*Attorney, Agent, or Firm*—Sughrue, Mion, Zinn, Macpeak and Seas

[57] ABSTRACT

In addition to positions and directions of feature points of a streaked pattern, such as minutiae of a fingerprint on a background, a plurality of novel counts and a density are automatically extracted for each feature point selected as a reference feature point. The density is determined in connection with adjacent feature points that are present in a predetermined neighborhood of the reference feature point. Each count is decided by the number of streaks or ridges intervening between the reference feature point and a related feature point that is nearest to the reference feature point among the feature points in a predetermined sector of the neighborhood.

5 Claims, 17 Drawing Figures

FIG. 4    FIG. 6    FIG. 7    FIG. 8
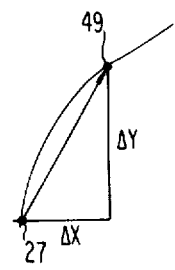
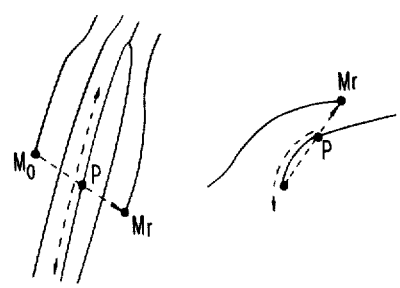
FIG. 10
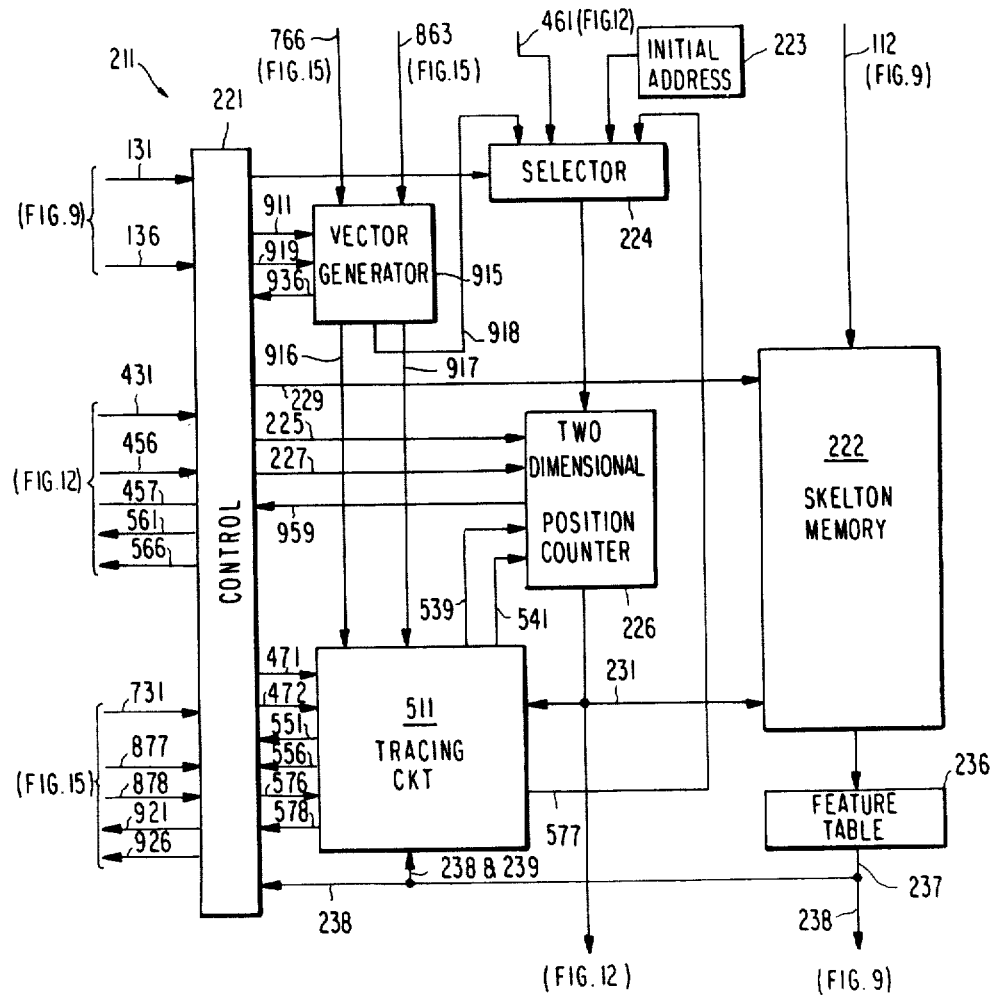

4,310,827

DEVICE FOR EXTRACTING A DENSITY AS ONE OF PATTERN FEATURES FOR EACH FEATURE POINT OF A STREAKED PATTERN

BACKGROUND OF THE INVENTION

This invention relates to a pattern feature extracting device for extracting pattern features from an area having a multiplicity of streaks at least on a fragmentary area thereof. The whole area will herein be referred to as a streaked pattern. A typical streaked pattern is a fingerprint with its background. The fingerprints, as called herein, may be a palm print, a toe print, a soleprint, an actual finger, or a pattern drawn by a skilled technician after a faint fingerprint remain or a latent fingerprint. The device is particularly useful for recognition, namely, discrimination, collation, and/or identification of the fingerprints.

Important pattern features of a fingerprint are those positions and directions of minutiae, such as bifurcation and abrupt endings "ridges," which will be named minutia positions and directions for the time being and will be defined later more exactly with reference to several of nearly twenty figures of the accompanying drawing. When a fingerprint is clearly impressed on a recording medium, such as a card, it is usually possible to extract the minutia positions and directions from such a fingerprint register to a number sufficient for recognition. The number of such minutia positions and directions is, however, generally meger when the fingerprint is one left at a scene of crime as a fingerprint remain or a latent fingerprint, which may be only a part of the fingerprint and be distorted.

K. Millard therefore revealed an improved device of the type specified hereinabove in his report titled "An Automatic Retrieval System for Scene of Crime Fingerprints" in Proceedings of Conference on the Science of Fingerprints, 24–25 September 1974, pages 1–14. Inter-minutia "ridge" counts between each minutia and five nearest minutiae to the right, of the type to be described later with reference to a few of the accompanying drawing figures, are used by Millard as "relationships (links)" besides the minutia positions and directions. The ridge counts are very effective in enhancing the pattern features and raising the accuracy and speed of fingerprint recognition.

It is thus urgently required to improve the information relating to the pattern features to be extracted from a streaked pattern without much complicating the device.

SUMMARY OF THE INVENTION

It is therefore an object of the present invention to provide a pattern feature extracting device of the type specified above, which is capable of extracting as many pattern features as possible in practice from a streaked pattern.

It is another object of this invention to provide a pattern feature extracting device of the type described, which is not intricate in structure.

It is still another object of this invention to provide a pattern feature extracting device of the type described, by which it is possible to carry out discrimination, collation, and/or identification of streaked patterns with high accuracy and at high speed.

It is rendered possible with a pattern feature extracting device according to this invention to extract "relationships" according to a novel description and also "densities" as additional information relating to a streaked pattern.

A device according to this invention is for extracting pattern features from a streaked pattern having a multiplicity of streaks at least on a fragmentary area thereof. In the streaked pattern, a first plurality of streaks of the multiplicity of streaks have a second plurality of feature points having at least one predetermined relationship to the first plurality of streaks.

According to this invention, the device comprises means for two-dimensionally scanning the streaked pattern in synchronism with a timing signal sequence to produce a sequence of picture element signals representative of the streaked pattern, means responsive to the picture element and the timing signal sequences for thinning the multiplicity of streaks generally to skeltons with a background area interposed between two adjacent skeltons to thereby convert the streaked pattern to a skelton pattern comprising skelton points representative of the skeltons and the background areas and to produce a sequence of skelton signals representative of the respective skelton points, feature point extracting and position detecting means, direction detecting means and relationship detecting means. The pattern features to be extracted will be described in the following. Functions to be performed by the three last-mentioned means are as follows.

The feature point extracting and position detecting means is responsive to the skelton and the timing signal sequences for extracting the feature points from the skelton points and for detecting positions of the extracted feature points in the skelton pattern, by the use of a skelton signal representative of each skelton point and with reference to the skelton signals representative of the skelton points in that first preselected area of the skelton pattern which is contiguous to and surrounds the first-mentioned skelton point. The feature point extracting and position detecting means thereby produces a sequence of position signals representative of the detected positions, respectively.

The direction detecting means is responsive to the position and the skelton signal sequences for detecting directions defined for each extracted feature point in relation to the skeltons into which the first plurality of streaks are thinned, by the use of a position signal representative of the position of each extracted feature point and with reference to the skelton signals representative of the skelton points in that second preselected area of the skelton pattern which is contiguous to and surrounds in the skelton pattern the skelton point extracted as the last-mentioned each extracted feature point. The direction detecting means thereby produces a sequence of direction signals representative of the detected directions, respectively.

The relationship detecting means is responsive to the position and the direction signal sequences for detecting a density for each extracted feature point selected as a reference feature point and a plurality of counts for the reference feature point. The density is determined by those of the extracted feature points which have positions in a predetermined area contiguous to and surrounding the position of the reference feature point and are selected as adjacent feature points. Each count is related to the number of skeltons intervening between the reference feature point and a related feature point that is nearest to the reference feature point among the extracted feature points having positions in each of a prescribed number of divisions of the skelton pattern.

The detected positions, the detected directions, the densities detected for the respective reference feature points, and the counts detected as relationships for the respective reference feature points are thus extracted as the pattern features.

BRIEF DESCRIPTION OF THE DRAWING

FIG. 4 is for use in defining a direction of an ending in the streaked pattern;

FIG. 6 is for use in defining a count for a feature point in the streaked pattern;

FIG. 7 is for use in defining a count for another feature point in the streaked pattern;

FIG. 8 is for use in defining a count for still another feature point in the streaked pattern;

FIG. 10 exemplifies in blocks a skelton memory, a tracing circuit, and associated circuits for use in the device depicted in FIG. 1;

DESCRIPTION OF THE PREFERRED EMBODIMENTS

Figure 1:
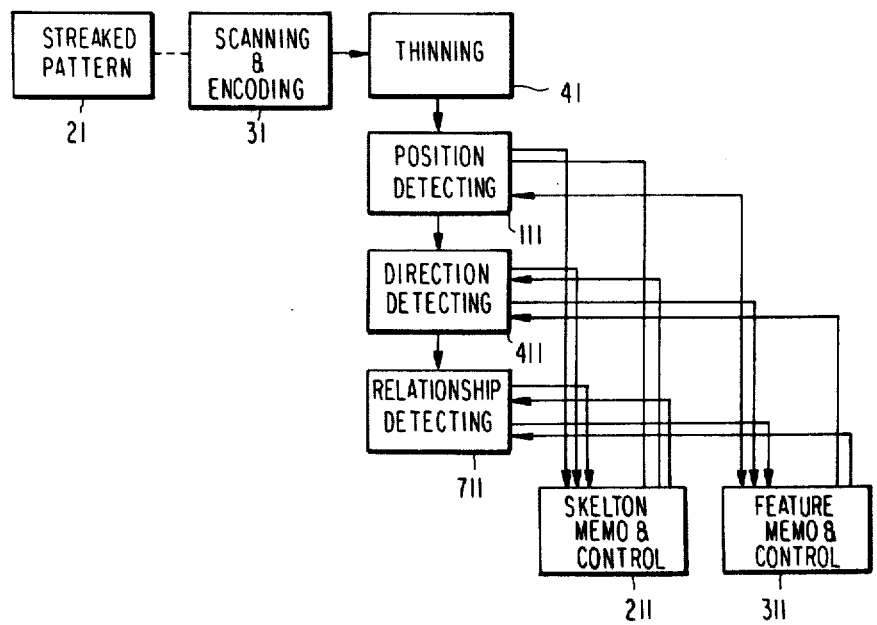
FIG. 1 shows in blocks a pattern feature extracting device according to a preferred embodiment of the instant invention together with a streaked pattern.

Referring to FIG. 1, a pattern feature extracting device according to a preferred embodiment of the present invention is for extracting pattern features from an area 21 comprising a streaked area. The area 21 as a whole will be referred to as a streaked pattern. The pattern features to be extracted by the device will presently be exemplified. For extraction of the pattern features, streaks in the streaked pattern 21 should have several feature points of at least one type, such as an abrupt ending of a streak, a bifurcation of a streak, and/or a crosspoint of two or more streaks. It should be possible to ascertain positions of the respective feature points with reference to at least one coordinate system. It should also be possible to define directions of the respective feature points in connection with those of the streaks which have the feature points. Merely for brevity of description, let it be presumed that the streaked pattern 21 is given by a fingerprint on a background and that the word "fingerprint" is now used in the narrow sense for a finger of a human being. In this event, the streaks are what are usually called ridges. The feature points are minutiae that consist of ridge endings and bifurcations.

Figure 2:
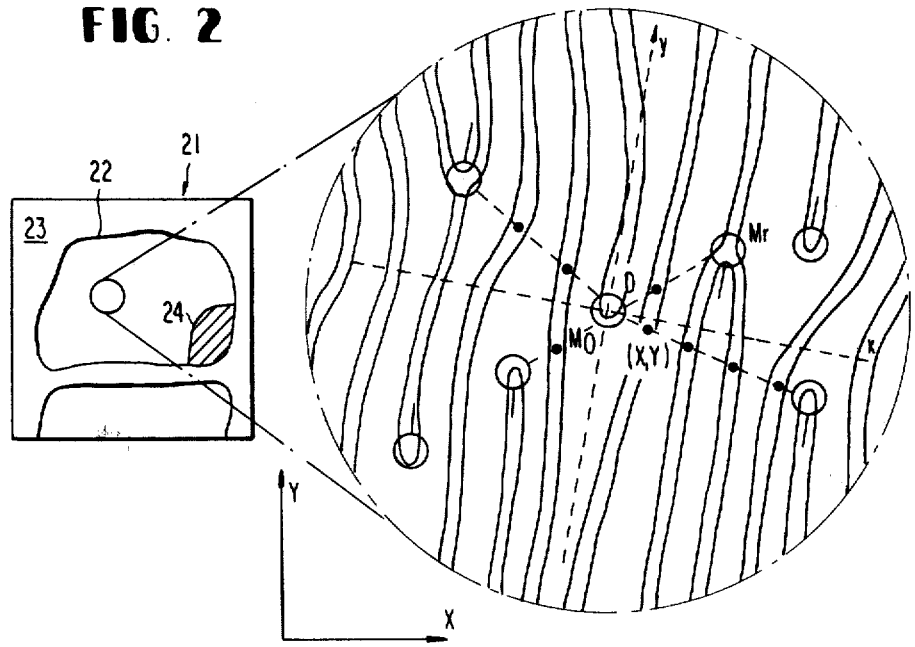
FIG. 2 schematically illustrates a streaked pattern shown in FIG. 1.

Turning to FIG. 2 for a short while, the streaked pattern 21 is composed of a fingerprint 22 and a background area 23. The fingerprint 22 generally includes an unclear area 24, where the ridges are hardly detected. The fingerprint 22 minus the unclear area or areas 24 will be called an objective region of the streaked pattern 21. The background and the unclear areas 23 and 24 will be named an accompanying region of the pattern 21. As exemplified on an enlarged scale, the objective region includes the ridges indicated at 26. Some of the ridges 26 have endings 27. Ridges that may or may not have endings 27, may have bifurcations 28. It is possible to describe positions (X, Y)'s of the minutiae 27 and 28 with reference to an X-Y coordinate system. As will become clear as the description proceeds, orientation or rotation and translation of the coordinate system relative to the streaked pattern 21 are not serious for a device according to this invention.

Turning back to FIG. 1, it is possible to understand that the device comprises several functional blocks which will be called "units" in the following. A scanning and encoding unit 31, known in the art, is for two-dimensionally scanning the streaked pattern 21 in synchronism with a timing signal sequence either generated therein or supplied thereto from an external time base (not shown). More particularly, the scan is along successive lines of principal scan. The streaked pattern 21 is thereby divided into a two-dimensional array of picture elements. The principal scan may be parallel to the X axis depicted in FIG. 2. The number of picture elements may, for example, be 512×512 for a streaked pattern 21 having an area of 25.6 mm square. A first picture element of a first line of principal scan may be picked up from the left top corner of the streaked pattern 21. This picture element will be referred to simply as the first picture element.

The unit 31 quantizes and encodes light and shade of the respective picture elements into a sequence of binary picture element signals. Furthermore, the unit 31 encodes the objective and the accompanying regions into a binary region signal sequence. By way of example, each of the picture element and the region signals is given a logic "1" and a logic "0" level when a picture element is for the ridge 26 and the objective region and when a picture element is for a "valley" between two adjacent ridges 26 and the accompanying region, respectively. As the case may be, a combination of the binary picture element signal sequence and the binary region signal sequence will simply be referred to as a picture element signal sequence.

The picture element and the region signal sequences are supplied as a two-bit signal to a thinning unit 41, also known in the art, together with the timing signal sequence. The thinning unit 41 is for thinning the ridges 26 generally to skeltons with an inter-skelton area interposed between two adjacent skeltons. The streaked pattern 21 is thereby converted to a skelton pattern comprising skelton points representative of the skeltons and the inter-skelton areas. The picture element signal sequence is converted to a sequence of skelton signals representative of the respective skelton points. The thinning unit 41 may therefore be called a skelton pattern generating unit. The thinning unit 41 produces the skelton signal sequence together with the region and the timing signal sequences as a thinning unit output signal 42. Signals will often be referred to in the following by the quantities they are representative of or indicative of.

Figure 3:
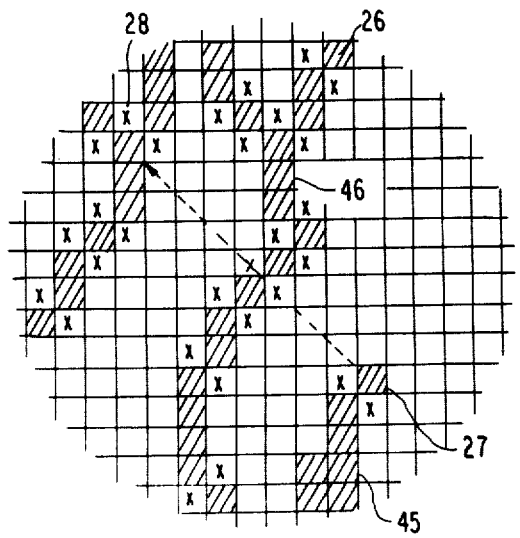
FIG. 3 exemplifies a portion of a skelton pattern generated in the device depicted in FIG. 1.

Turning to FIG. 3, a portion of the skelton pattern for the objective region is exemplified with the skelton points arranged in orthogonal rows and columns merely for convenience of further description. The skelton pattern includes those skelton points for the skeltons which are depicted with close hatches and indicated at 26 by the use of the reference numeral for the ridges in the streaked pattern 21. The skelton points for the skeltons will be called ridge points 26. Skelton points for the inter-skelton areas will be named white points. The illustrated ridge points 26 includes a skelton point for an ending and two other skelton points for bifurcations. Such skelton points will be referred to merely as an ending and a bifurcation and denoted by 27 and 28. The ridge points 26 may further include singular points 45 where the picture elements for a ridge are not thinned to a skelton for some reason or another. A ridge point 26 other than an ending 27, bifurcation 28, and singular point 45 will be named a general ridge point 46. Among the white points, those contiguous to the ridge points 26 and indicated by crosses will be called contiguous points. More specifically, two of the contiguous points in each 2×2 matrix of neighboring skelton points form a checkered pattern in cooperation with the ridge points 26 included in the four skelton points.

From FIG. 3, it is understood that an ending 27, bifurcation 28, singular point 45, general ridge point 46, contiguous point, and the like are discriminated from one another by the use of a 3×3 matrix of neighboring skelton points. When a center skelton point of the 3×3 matrix is an ending 27, only one ridge or branch point 26 is present in eight adjacent skelton points in the matrix. When the center skelton point is a bifurcation 28, three and only three ridges or branch points 26 are contained in the matrix. When the center skelton point is a singular point 45, at least three other ridge points 26 are contiguous to the center skelton point and to one another. When the center skelton point in a general ridge point 46, two and only two other ridge points 26 are contiguous to the center skelton point. These two ridge points 26 may or may not be contiguous to each other.

In FIG. 3, a vector is depicted by a dashed line to show a distance vector to be described later. The 3×3 matrix of neighboring skelton points will be referred to merely as a 3×3 matrix and the center skelton point of the 3×3 matrix, simply as a center skelton point.

Turning further to FIG. 4, let the skelton that abruptly ends at an ending 27 be called a single branch and traced a predetermined arcuate length from the ending 27. A skelton point 49 arrived at will be called an arrival point. A minutia direction D of the ending 27 is defined by the direction of a single direction vector drawn from the ending 27 to the arrival point 49. More specifically, the direction D is defined by ($\Delta X$, $\Delta Y$), where $\Delta X$ and $\Delta Y$ represent X and Y components of the direction vector. If one of another minutia 27 or 28, a singular point 45, and a skelton point in the accompanying region is reached during the branch tracing, such a particular point is used as the arrival point 49.

Figure 5:
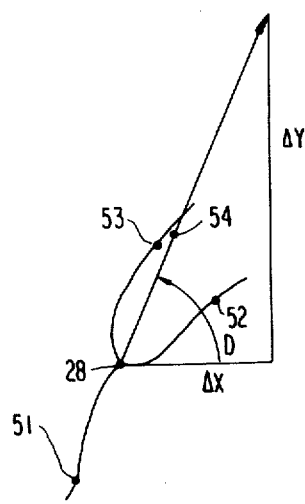
FIG. 5 is for defining a direction of a bifurcation in the streaked pattern.

Referring now to FIG. 5, a bifurcation 28 is shared by three branches. Among three angles that are formed by the branches and will shortly more exactly be defined, it is generally possible to find a smallest angle. Let the branch opposite to the smallest angle be called a first branch and others, a second and a third branch in the counterclockwise order around the bifurcation 28. First through third skelton points 51, 52, and 53 on the first through the third branches are arrival points in the meaning described in conjunction with FIG. 4. The three angles are those formed between two adjacent ones of first through third direction vectors starting at the bifurcation 28 and ending at the first through the third arrival points 51 to 53. A fourth skelton point 54 is selected so that the first and the fourth skelton points 51 and 54 be symmetric with respect to the bifurcation 28. A vector that starts at the bifurcation 28 and ends at the fourth skelton points 54 will be named a symmetric vector, which is equal to the first direction vector in magnitude and direction and different only in sense. A minutia direction D of the bifurcation 28 is defined by the direction of the symmetric vector. When X and Y components of the first through the third direction vectors are denoted by ($\Delta X_1$, $\Delta Y_1$), ($\Delta X_2$, $\Delta Y_2$), and ($\Delta X_3$, $\Delta Y_3$), the direction D is determined by ($\Delta X$, $\Delta Y$), where:

$$\Delta X = \Delta X_2 + \Delta X_3 - \Delta X_1$$

and $$\Delta Y = \Delta Y_2 + \Delta Y_3 - \Delta X_1.$$

Referring again to FIG. 2, minutiae are encircled. Minutia directions are illustrated by short thick lines. One of the minutiae is designated by $M_O$ and will be called a reference minutia. A local or x-y coordinate system is defined by the position (X, Y) of the reference minutia $M_O$ and the direction D thereof with the positive sense of the y axis given by the reference minutia direction. An inter-minutia ridge count is now given a novel description. First, a transverse vector is drawn from the reference minutia $M_O$ to one of the minutiae in each quadrant of the local coordinate system that is nearest to the reference minutia $M_O$. Such a minutia will be called a related minutia. The related minutia in an r-th quadrant will be denoted by Mr. Secondly, the number of points of intersection of the transverse vector with the intervening skeltons is counted (ridges being depicted in FIG. 2 rather than skeltons). Although expressed in plural, there may be no intervening skeltons. In the third place, the points of intersection are examined as will shortly be described. An inter-minutia ridge count Wr for the r-th quadrant is given by the number corrected according to the result of examination. The minutiae 27 or 28 are given ordinal or serial numbers as will later be exemplified. A novel set of relationships Rr for the reference minutia $M_O$ is defined by the inter-minutia ridge counts Wr's for the respective quadrants and the serial numbers of the related minutiae Mr's. As will become clear later, it is possible to carry out the examination simultaneously with the counting.

Referring to FIGS. 6, 7, and 8, the skelton which the tranverse vector intersects at a point of intersection P is traced a preselected arcuate length in either sense from the point of intersection P. If either the minutia $M_O$ or Mr or any one of the points of intersection that has already been counted into the ridge count, is reached during the skelton tracing, the point of intersection P under consideration is excluded from the count. The inter-minutia ridge counts Wr's are therefore three, zero, and one for the reference minutiae $M_O$'s illustrated in FIGS. 6, 7, and 8, respectively.

Referring to FIG. 2 once again, pattern features to be extracted from a streaked pattern 21 by a device comprising the scanning and encoding unit 21, the thinning unit 31, and other units to be described with reference to the remaining figures of the accompanying drawing, are minutia or feature positions (X, Y)'s, minutia or feature directions D's, and a set of relationships Rr for each reference minutia, such as $M_O$. In addition, a density or concentration C for each reference minutia is used as one of the pattern features. For the device being illustrated, the density C is defined by the number of minutiae that are present in a predetermined area contiguous to and surrounding the reference minutia and will be called adjacent minutiae. When the enlarged area is considered as the predetermined area, the density C is seven, the illustrated reference minutia $M_O$ inclusive.

Figure 9:
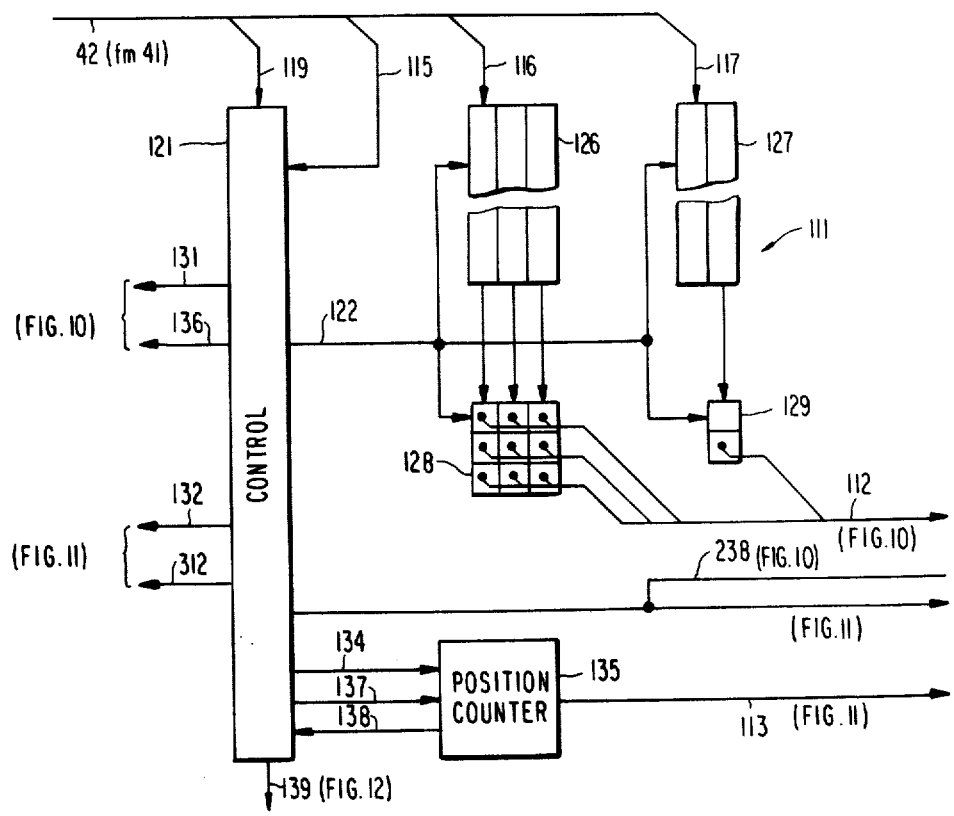
FIG. 9 is a block diagram of a position detecting unit for use in the device illustrated in FIG. 1.

Referring to FIG. 1 again and to FIG. 9 afresh, a skelton word producing unit 111 is responsive to the thinning unit output signal 42 for producing a sequence of skelton word signals 112 and another sequence of skelton position signals 113 as will presently be described. Each skelton word signal 112 is a ten-bit signal composed of a nine-bit window signal representative of skelton points in each 3×3 matrix and a region signal indicative of that one of the objective and the accompanying regions in which the center skelton point is present. For an example of the skelton word producing unit 111 depicted in FIG. 9, the output signal 42 comprises a timing signal sequence 115, a skelton signal sequence 116, and a region signal sequence 117, all described above. The output signal 42 preferably comprises a position detection start signal 119, which is produced in the scanning and encoding unit 31, the thinning unit 41, or the external time base for the purpose to be shortly described. It is also possible to make the skelton word producing unit 111 to produce the position detection start signal 119 for use therein. Types of the center skelton point, such as an ending 27, the difference between the objective and the accompanying regions, will be called "classes".

In FIG. 9, the skelton word producing unit 111 comprises a word production control circuit 121 responsive to the timing signal sequence 115 for producing a sequence of shift pulses 122. The skelton and the region signal sequences 116 and 117 are shifted by the shift pulse sequence 122 through three-row and two-row multistage shift registers 126 and 127, respectively. The three-row shift register 126 are for registering skelton signals for three lines of principal scan and for producing the skelton signals from the respective rows in parallel with delays of one, two, and three lines of principal scan. The two-row shift register 127 is for producing the region signal with a delay of two lines of principal scan. The skelton signals produced by the three-row shift register 126 in three successions are supplied to a window shift register 128 having a 3×3 matrix of shift register stages. The region signals successively produced by the two-row shift register 127 are supplied to a region shift register 129 having two stages. While shifted by the shift pulse sequence 122, the skelton signals registered in the window shift register matrix stages are simultaneously produced as the window signal sequence. The region signal sequence is produced from the region shift register 129. It is now understood that the skelton signal produced from the center shift register stage of the window shift register 128 and the region signal simultaneously produced from the region shift register 129 have a common delay corresponding to two lines of principal scan plus two timing intervals of the timing signal sequence 115 with respect to the corresponding signals 116 and 117 supplied to the unit 111. The position detection start signal 119 is produced at this instant.

Responsive to the position detection start signal 119, the word detection control circuit 121 turns first and second mode signals 131 and 132 on for the purposes that will become clear as the description proceeds, produces a reset signal 134 for clearing a skelton position counter 135, and starts producing a sequence of skelton word write signals 136 and another sequence of count-up signals 137 in synchronism with the timing signals 115. The count-up signals 137 are for counting up the counter 135 to make the latter produce the skelton position signals 113 indicative of the positions of those skelton points in the skelton pattern which are represented by the skelton signals successively produced by the window shift register center stage. When counted up to a full count indicative of completion of scan of the streaked pattern 21, the counter 135 produces a skelton position count end signal 138. Responsive to the end signal 138, the control circuit 121 switches the mode signals 131 and 132 off and produces a direction detection start signal 139.

In FIG. 1, a first memory and control unit 211 is, among others, for memorizing the skelton pattern and is supplied with the first mode signal 131, the skelton word signal sequence 112, and the skelton word write signal sequence 136 from the skelton word producing unit 111. As will become clear as the description proceeds, the first memory and control unit 211 is also for carrying out control of other units to be described later, tracing of the skelton branch or branches for detection of the direction of each minutia, and tracing of the transverse vector and skeltons for calculation of the ridge counts for each minutia. As the case may be, the first memory and control unit 211 is called a skelton memory and control unit.

Referring now to FIG. 10, an example of the first memory and control unit 211 comprises a first control circuit 221 to be rendered clear as the description proceeds, a skelton memory 222 supplied with the skelton word signal sequence 112 for memorizing the skelton pattern as will presently be described, and an initial address generator 223 for always generating an initial address of the skelton memory 222 for the center skelton point corresponding to the first picture element. Responsive to the first mode signal 131, the control circuit 221 gives a selection signal a level or code for making a selector 224 select the initial address and a preset signal 225 for presetting a two-dimensional position counter 226. Inasmuch as the initial address is now selected by the selector 224, the preset signal 225 presets the initial address in the position counter 226. Responsive to the skelton word write signal sequence 136, the control circuit 221 produces a count-up signal sequence 227 and a local skelton word write signal sequence 229. Counted up by the count-up signal sequence 227, the position counter 226 make a local address signal sequence 231 increase one by one. The local skelton word write signal sequence 229 writes the skelton word signal sequence 112 in the skelton memory 222 at addresses successively specified by the local address signal sequence 231.

Being addressed, the skelton memory 222 supplies the skelton word signal sequence to a feature table 236 as a matrix word signal sequence. With reference to that skelton pattern portion in the 3×3 matrix and that difference between the objective and the accompanying regions which are represented by each matrix word signal, the feature table 236 produces a sequence of word class signals 237. Each word class signal 237 comprises a word flag 238 indicative at a time one of an ending 27, bifurcation 28, singular point 45, general ridge point 46, contiguous point, white point other than the contiguous point, and skelton point in the accompanying region. Only when the word flag 238 indicates one of an ending 27, bifurcation 28, general ridge point 46, and contiguous point, the word class signal 237 further comprises a branch code signal 239. As will later be described, the branch code signal 239 is for use either in the branch or skelton tracing or the transverse vector tracing and comprises up to three branch codes. A branch code represents X and Y components of an elementary displacement (δX, δY) from the center skelton point to each branch point in the eight adjacent skelton points in the 3×3 matrix represented by each skelton word signal 112. Although a few signal lines are labelled "238" and/or "239" in the accompanying drawing figures, this does not mean that a sequence of word flags 238 and another sequence of branch code signals 239 are separately transmitted. The word flags 238 indicative of an ending 27 and a bifurcation 28 will be called minutia flags.

Referring back to FIGS. 1 and 9, a second memory and control unit 311 is supplied with the second mode signal 132 and the word class signal sequence 237. It is possible to understand that the word class signal sequence 237 (238) is once supplied to the skelton word producing unit 111 and thence to the second memory and control unit 311. Under the circumstances, the word production control circuit 121 supplies the second memory and control unit 311 with a minutia and position write signal sequence 312 only when the word flags 238 are minutia flags. The skelton position signal sequence 113 is also supplied to the second memory and control unit 311. It is now possible to deem the skelton word producing unit 111 as a feature point extracting and position detecting unit. As will become clear later as the description proceeds, the second memory and control unit 311 is for memorizing the pattern features, such as the positions (X, Y)'s of the minutiae 27 and 28, and for controlling other units by the use of various signals derived therefrom and related thereto. The seond memory and control unit 311 will therefore be named a feature memory and control unit depending on the circumstances.

Figure 11:
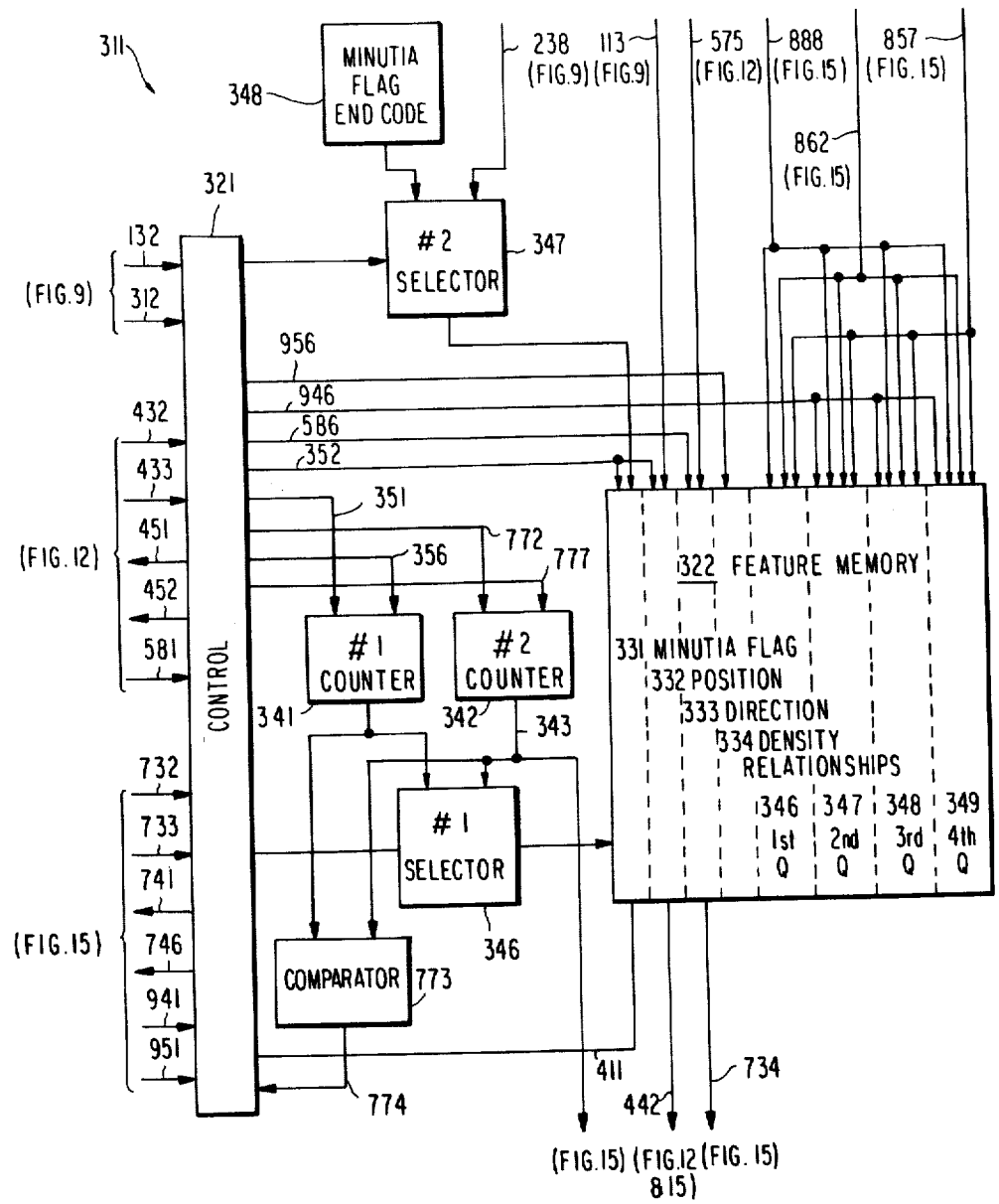
FIG. 11 exemplified in blocks a feature memory and related circuits for use in the device shown in FIG. 1.

Referring now to FIG. 11, an example of the second control and memory unit 311 comprises a second control circuit 321 similar to the first control circuit 221, a feature memory 322 having minutia flag, position, direction, density, and first through fourth relationship (quadrant inter-minutia ridge counts and serial numbers) areas 331, 332, 333, 334, 336, 337, 338, and 339, a first counter 341 for producing a first count signal sequence, a second counter 342 for producing a second count signal sequence 343 to be described later, a first selector 346 for selecting either of the first and the second count signal sequences, and a second selector 347 for selecting either of the word class signal sequence 237 and a minutia flag end code produced by a minutia flag end code generator 348. As will shortly become clear, the end code indicates an end of a minutia flag sequence selected from the word class signal sequence 237.

Responsive to the second mode signal 132, the control circuit 321 produces a first reset signal 351 for resetting the first counter 341 and first and second selection signals for making the first and the second selectors 346 and 347 select the first count signal sequence and the word class signal sequence 237, respectively. Supplied with a first minutia and position write signal of the sequence 312, the control circuit 321 produces a feature memory write signal of a sequence 352. In response to the feature memory write signal 352, a minutia flag in the sequence 237 and the skelton position signal 113 simultaneously supplied to the feature memory 322 through the first selector 346 and directly, respectively, are stored in the minutia and the position areas 331 and 332 at an address specified by the first count signal indicative of the reset count of the first couner 341. Immediately after the storage, the control circuit 321 produces a first count-up signal of a sequence 356 for counting up the first counter 341 one.

With the storage and the count-up repeated, the minutia flags of the sequence 237 and the skelton position signals 113 representative of the minutia positions (X, Y)'s are stored in the flag and the position areas 331 and 332 of the feature memory 322 at addresses successively indicated by the gradually counted-up first counter 341. When the second mode signal 132 is eventually turned off, the control circuit 321 produces the last feature memory write signal of the sequence 351. The second selection signal is thereupon switched to make the second selector 347 select the minutia flag end code. The end code is stored in the flag area 331 at an address specified by the subsequently counted-up first counter 341.

Figure 12:
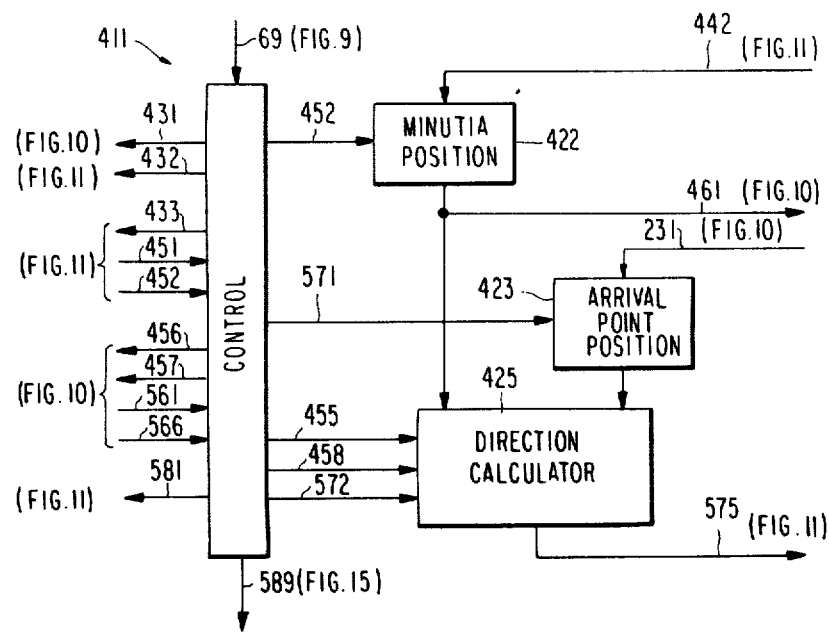
FIG. 12 is a block diagram of a direction detecting unit for use in the device illustrated in FIG. 1.

Referring now to FIG. 12 in addition to FIG. 1, the direction detection start signal 139 puts a direction detecting unit 411 into operation of detecting the directions D's of the minutiae stored in the second memory and control unit 311. An example of the direction detecting unit 411 shown in FIG. 12 comprises a direction detection control circuit 421, a reference minutia position register 422, an arrival point register 423, and a direction calculating circuit 425. Responsive to the start signal 139, the control circuit 421 supplies the first memory and control unit 211 with a third mode signal 431 and the second memory and control unit 311 with a fourth mode signal 432 and a first loop signal of a sequence 433. Under the control of the first memory and control unit 211, the direction detecting unit 421 calculates the minutia directions D's with reference to the skelton word signal sequence 112 memorized in the first memory and control unit 211 and the minutia flags and the minutia positions memorized in the second memory and control unit 311. Detailed operation will shortly be described.

Turning back temporarily to FIG. 11, the control circuit 321 is again energized by the fourth mode signal 432 and produces the first reset signal 351 and the selection signal for making the first selector 346 select the first count signal sequence. Addressed by the first count signal, the flag and the position areas 331 and 332 produce a minutia flag and a position output signal of sequences 441 and 442. Responsive to the first loop signal 433, the control circuit 321 examines the flag output signal 441 and produces a first minutia status signal of a sequence 451 indicative of one of two statuses of ending read-out and bifurcation read-out for the time being when the flat output signal 441 represents an ending 27 and a bifurcation 28, respectively. The control circuit 321 produces also a first strobe signal of a sequence 452 to be shortly described. When the minutia end code is eventually produced as the flag output signal 441 as will later be described, the status signal 451 indicates a third status of completion of the minutia sequence read-out.

In FIG. 12, the strobe signal 452 makes the control circuit 421 produce a minutia position set signal of a sequence 453 for setting the position output signal 442 in the reference minutia position register 422 and a reset signal of a sequence 455 for resetting the direction detecting circuit 425. Immediately thereafer, the control circuit 421 produces a two-dimensional position set signal of a sequence 456 and a trace signal 457. The control circuit 421 decodes the minutia status signal 451 and supplies the direction calculating circuit 425 with a branch mode signal of a sequence 458 indicative of one at a time of the single branch of an ending 27 and the first through the third branches of a bifurcation 28. The register 422 produces a reference minutia position signal of a sequence 461. As will become clear as the description proceeds, the trace signal 457 is for making the first memory and control unit 211 start the branch tracing operation described in connection with FIGS. 4 and 5.

Referring back to FIG. 10, the control circuit 221 is again put into operation by the third mode signal 431 and gives the selection signal a second level for making the selector 224 select the reference minutia position signal sequence 461. Responsive to the two-dimensional position set signal 456, the control circuit 221 produces the preset signal 225 to preset the reference minutia position signal 461 in the two-dimensional position counter 226, which now keeps producing the reference minutia position as the local address signal 231 until the counter 226 is renewed as will shortly be described. Addressed by the local address signal 231, the skelton memory 222 delivers a matrix word signal to the feature table 236, which produces a word class signal 237.

Inasmuch as the word flag 238 of the word class signal 237 now indicates either an ending 27 or a bifurcation 28, the word class signal 237 further comprises a branch code signal 239 for use in tracing one of the single and the first through the third branches at a time starting at the minutia 27 or 28. As will presently be described, the counter 226 is made to sequentially produce the local address signal 231 indicative of the general ridge point 46 on the branch being traced. The matrix word signals to be successively supplied to the feature table 236 will represent general ridge points 46.

In FIG. 10, the control circuit 221 produces a trace mode signal 471 that is now indicative of a direction detection mode. Responsive to the trace signal 457, the control circuit 221 produces a trace start signal 472 for putting a tracing circuit 511 into operation. Starting at the reference minutia position, the tracing circuit 511 traces either the single branch of the ending 27 or one of the first through the third branches of the bifurcation 28 with reference to the branch code signals 239.

Figure 13:
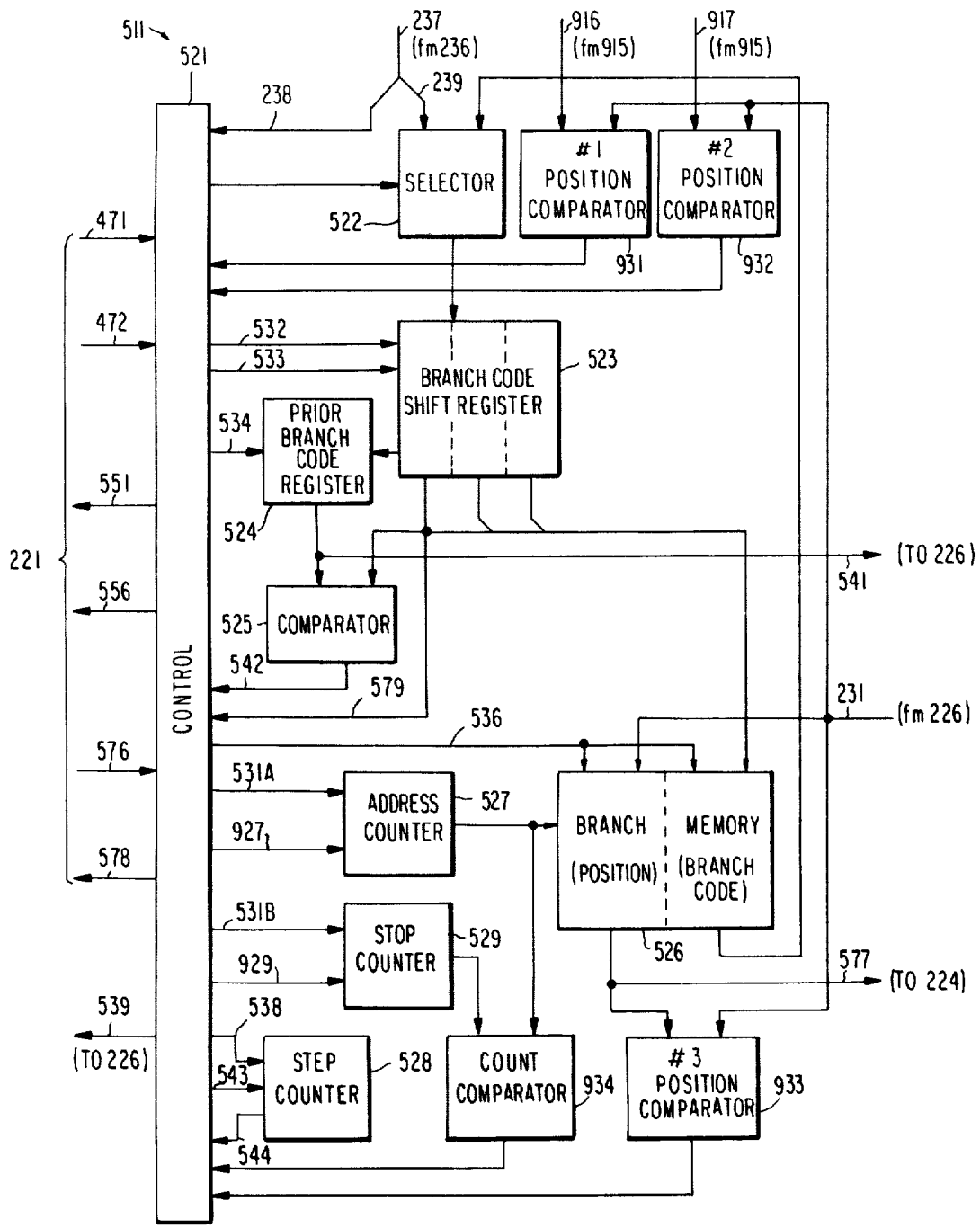
FIG. 13 is a block diagram of an example of the tracing circuit depicted in FIG. 10.

Referring now to FIG. 13 along with FIG. 10, the tracing circuit 511 comprises a trace control circuit 521, a selector 522, a branch code shift register 523 for up to three branch codes, a prior branch code register 524, a comparator 525, a branch memory 526, an address counter 527, a step counter 528, and a stop counter 529. Responsive to the trace mode signal 471 that now indicates the direction detection mode, the control circuit 521 produces a selection signal for making the selector 522 select the word class signal sequence 237 and supply a branch code signal 239 to the branch code shift register 523. Also, the control circuit 521 produces reset signals 531A and 531B for resetting the address and the stop counters 527 and 529, subsequently a set signal 532 for simultaneously setting the branch code or codes of the branch code signal 239 in the shift register 523 with the branch code or codes, if less than three, stored in the stage or stages as nearer as possible to that output stage of the shift register 523 which is connected to the prior branch code register 524, and immediately thereafter a set of shift-set signals 533 and 534. The shift-set signals 533 and 534 cooperate to shift the branch code or codes in the shift register 523 towards the output stage and puts an end of branch code in that stage of the shift register 523 which is nearest to the output stage and in which no branch code remains. The shift-set signals 533 and 534 cooperate also to transfer the branch code from the shift register output stage to the prior branch code register 524.

Thereafter, the control circuit 521 produces a write signal 536 and a preset signal 538. The write signal 536 loads the branch memory 526 with the local address signal 231 supplied thereto from the two-dimensional position counter 226 (FIG. 10). The write signal 536 also loads the branch memory 526 with the branch end code or the branch code or codes remaining in the shift register 523. The minutia position and either the branch end code or the branch code or codes are for use in either indicating completion of the branch tracing or in tracing the remaining branch or branches of the first through the third branches as will soon be described. The preset signal 538 presets the predetermined arcuate length in the step counter 528. Subsequently, the control circuit 521 supplies a counter set signal 539 to the position counter 226 to renew the count therein by the X and the Y components of the elementary displacement ($\delta X$, $\delta Y$) that are indicated by the branch code retained in the prior branch code register 524 and supplied to the position counter 226 through a connection 541.

In FIG. 10, the two-dimensional position counter 226 now makes the local address signal 231 indicate a branch point next adjacent to the minutia 27 or 28. Addressed by the local address signal 231, the skelton memory 222 makes the matrix word signal represent $3 \times 3$ matrix having the next adjacent branch point at the center. The feature table 236 supplies the selector 522 with a new word class signal 237 representative of the class of the "next adjacent" branch point.

In FIG. 13, the control circuit 521 checks the word flag 238 of the new word class signal 237. When the word flag 238 indicates a general ridge point 46, the control circuit 521 produces the set signal 532 again to store the branch code signal 239 in the branch code shift register 523 and thereby to renew the content of the shift register 523. In this connection, it is to be noted that the branch code signal 239 for each general ridge point 46 consists of two branch codes, one of which is now indicative of the minutia 27 or 28. The comparator 525 compares the branch code retained in the prior branch code register 524 with that one of the two branch codes which is stored in the shift register output stage. The comparison is carried out by calculating a sum of the X components of the respective elementary displacements $\delta X$'s indicated by the two branch codes being compared and another sum of the Y components δY's of the respective elementary displacements represented by the two branch codes.

The comparator 525 supplies the control circuit 521 with a comparison signal 542 representative of the sums. If both sums are equal to zero, the branch point is indicated by the branch code stored in the output stage of the shift register 523 is the minutia 27 or 28. The control circuit 521 therefore produces the shift signal 533 alone to shift the other branch code to the output stage. The other branch code now indicates the branch point to which the branch tracing should proceed. The control circuit 521 produces the shift-set signals 533 and 534 to move the other branch code to the prior branch code register 524. The control circuit 521 produces also a count-down signal 543 for counting down the step counter 528. Renewal of the position counter 226 (FIG. 10), test of the branch code stored in the shift register output stage, and count-down of the step counter 528 are repeated insofar as the word flags 238 are found by the control circuit 521 to be representative of general ridge points 46.

When counted down to zero, the step counter 528 produces an end of arcuate length signal 544. The control circuit 521 produces a local trace status signal 551 representative of arcuate length end and a local strobe signal 556. When the word flag 238 is found by the control circuit 521 to represent one of an ending 27, bifurcation 28, singular point 45, and skelton point in the accompanying region, the control circuit 521 makes the states signal 551 indicate interruption of the branch tracing and produces the strobe signal 556. The address counter 527 is kept in the reset state.

Referring to FIGS. 10 and 12, the local trace status signal 551 and the local strobe signal 556 are transmitted by the first control circuit 221 to the direction detection control circuit 421 as an inter-unit trace status signal 561 and an inter-unit strobe signal 566. The direction detection control circuit 421 produces an arrival set signal 571 for setting a local address signal 231 indicative of an arrival point, namely, one of the arrival point 49, 51, 52, or 53, another minutia 27 or 28, a singular point 45, and a skelton point in the accompanying region, that is reached by the branch tracing operation described above. The control circuit 421 transfers the minutia status signal 451 described in conjunction with FIG. 11 to the direction calculating circuit 425 as a direction set signal 572. Furthermore, the control circuit 421 produces a second trace signal 457 if the minutia status signal 451 being supplied, indicates a bifurcation 28.

As will later be described in detail, the direction calculating circuit 425 calculates the direction of a direction vector that starts at the minutia position registered in the minutia position register 422 and ends at the arrival point held in the arrival point register 423. When the minutia status signal 451 indicates ending read-out and consequently when the branch mode signal 458 indicates the single branch of an ending 27, the direction calculating circuit 425 produces a direction signal 575 representative of the calculated direction. When the minutia status signal 451 indicates bifurcation read-out, the result of direction calculation is retained in the direction calculating circuit 425 as will presently be described.

In FIGS. 10 and 13, the second trace signal 457 produced while the local trace status signal 551 indicates arcuate length end, makes the first control circuit 221 produce a trace next signal 576 and make the selector 224 select that output signal 577 of the tracing circuit 511 which will presently be described. Responsive to the trace next signal 576, the trace control circuit 521 produces a counter set signal 578 for making the first control circuit 221 produce the preset signal 227 to set the output signal 577 in the two-dimensional position counter 226.

In FIG. 13, the above-mentioned output signal 577 is produced from the branch memory 526 and represents the position of the minutia 27 or 28 being dealt with. Responsive to the trace next signal 576, the control circuit 521 temporarily makes the selector 522 select another output signal of the branch memory 526 indicative of either the branch end code or one of the branch codes which are memorized in the branch memory 526 and are indicative of two remaining branch points starting from the bifurcation 28. The control circuit 521 produces the set signal 532 for the branch code shift register 523 and is supplied with the code put in the output stage through a connection 579.

Referring to FIGS. 10, 12, and 13, the trace control circuit 521 makes the local trace status signal 556 indicate completion of trace when the code stored in the output stage of the branch code shift register 523 is found to be the branch end code. The first control circuit 221 makes the inter-unit trace status signal 561 indicate completion of branch tracing. The direction detection control circuit 421 turns the branch mode signal 458 off and produces an inter-unit direction write signal 581 to be described later. When the code under consideration is a branch code, the trace control circuit 521 again produces the shift-set signals 533 and 534, the write signal 536, and the preset signal 538. Another of the branches starting at the bifurcation 28 is traced. The direction calculating circuit 425 calculates the direction for the other branch. The direction for still another of the branches is likewise calculated. The code checked by the trace control circuit 521 through the connection 579 is now the branch end code. The direction detection control circuit 421 turns the branch mode signal 458 off and produces the direction write signal 581. The direction calculating circuit 425 produces the direction signal 575 representative of the direction defined in connection with FIG. 5 as will soon become clear.

Again referring to FIG. 11 in addition to FIG. 12, the inter-unit direction write signal 581 is supplied to the second control circuit 321 and produced thereby as a local direction write signal 586. The direction signal 575 supplied to the direction area 333 of the feature memory 322 is stored in an address which is indicated by the first count signal and from which the position output signal 442 registered in the minutia position register 422 is produced. The control circuit 321 produces another first count-up signal 356 to make the feature memory 322 produce another flag output signal 441 representative of a next following minutia 27 or 28 in the scan of the streaked pattern 21 and another position output signal 442 indicative of the minutia position of the next following minutia. Unless the flag output signal 441 indicates the minutia flag end code, the above-described direction detection operation is repeated. When the flag output signal 441 eventually indicates the end code, the control circuit 321 makes the inter-unit minutia status signal 451 indicate completion of minutia sequence read-out. The direction detection control circuit 421 turns the third and the fourth mode signals 431 and 432 off and produces a relation detection start signal 589.

Figure 14:
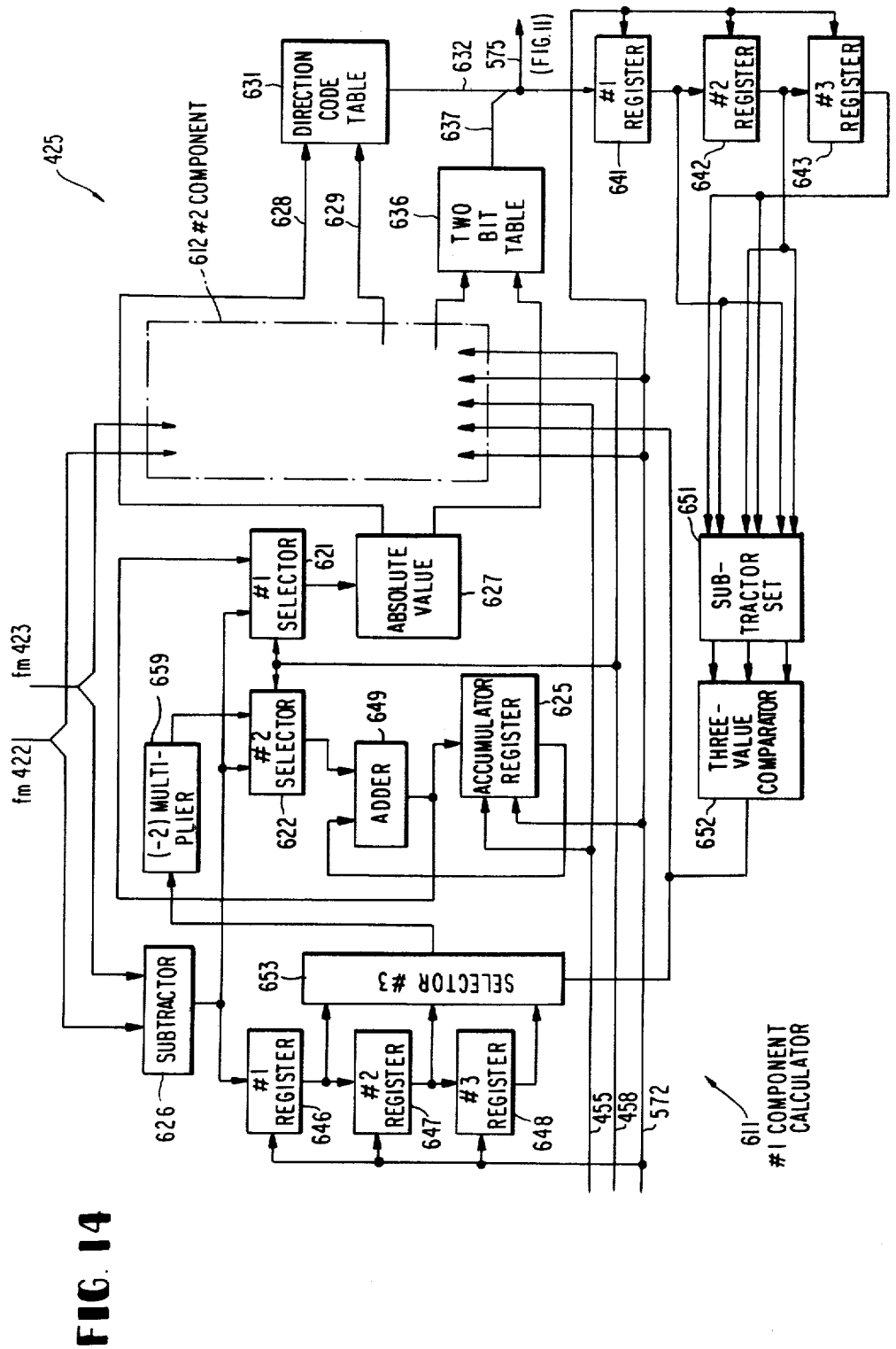
FIG. 14 is a block diagram of a direction calculating circuit for use in the direction detecting unit illustrated in FIG. 12.

Turning now to FIG. 14, an example of the direction calculating circuit 425 comprises first and second component calculating circuits 611 and 612. The first component calculating circuit 611 comprises first and second selectors 621 and 622, each of which is supplied with a first and a second selector input signal and selects the first selector input signal whenever the branch mode signal 458 is produced with the minutia position registered in the register 422 (FIG. 12). The reset signal 455 resets an accumulator register 625. As soon as the arrival point is registered in the register 423 (FIG. 12), a subtractor 626 calculates the difference between the X components between the minutia position and the arrival point to supply the difference to the first selector 621 as the first selector input signal. An absolute value calculator 627 produces an X output signal 628 representative of the absolute value of the difference. Similarly, the second component calculating circuit 612 produces a Y output signal 629 representative of the absolute value of the difference between the Y components of the minutia position and the arrival point.

The direction calculating circuit 425 further comprises a direction code table 631 for converting the X and the Y output signals 628 and 629 to a direction code signal 632 representative of a direction code that gives the direction of a code vector as herein called. The code vector and the direction vector for the minutia 27 or 28 are symmetric with respect to an X' and a Y' axis of an X'-Y' coordinate system into which the X-Y coordinate system is translated with the origin made to coincide with the minutia being treated. In other words, the code vector is always in the first quadrant of the X'-Y' coordinate system. The sign bits (usually the most significant bits) of the X and the Y output signals 628 and 629 are converted by a two-bit table 636 to a quadrant code signal 637 representative of the quadrant of the X'-Y' coordinate system in which the direction vector is present. The direction and the quadrant code signals 632 and 637 are used as the direction signal 575.

When the minutia being dealt with is an ending 27, the direction signal 575 indicates the minutia direction D. When the minutia is a bifurcation 28, the direction signal 575 is kept in a first direction register 641 by the direction set signal 572. As the directions are thus calculated for another and still another branch, the direction signal 575 is shifted to a second direction register 642 and thence to a third direction register 643. On the other hand, the signals produced by the subtractor 626 are likewise shifted through first through third difference registers 646, 647, and 648. Responsive to each direction set signal 572, the accumulator register 625 supplies its content to an adder 649, which calculates a sum of the contents and the difference supplied thereto through the first selector 621 and stores the sum back in the accumulator register 625.

When the branch mode signal 458 (FIG. 12) is turned off upon completion of the branch tracing, each selector 621 or 622 is made to select the second selector input signal. In the meantime, a set of subtractors 651 calculates the angles between the first through the third vectors described in connection with FIG. 5. Responsive to the angles, a three-value comparator 652 detects the smallest angle and supplies a third selector 653 with a signal indicative of the first vector. The selector 653 selects one of the differences retained in the difference registers 646 through 648 that is denoted in FIG. 5 by $\Delta X_1$. A minus two multiplier 659 calculates $(-2\Delta X_1)$, which is selected by the second selector 622 and added to the sum of the X components of the first through the third vectors. The adder 659 thus supplies the first selector 621 with a sum of the X components of the second and the third vectors minus the X component of the first vector. With similar calculation carried out in the second component calculating circuit 612, the direction signal 575 now indicates the direction of the bifurcation 28.

Figure 15:
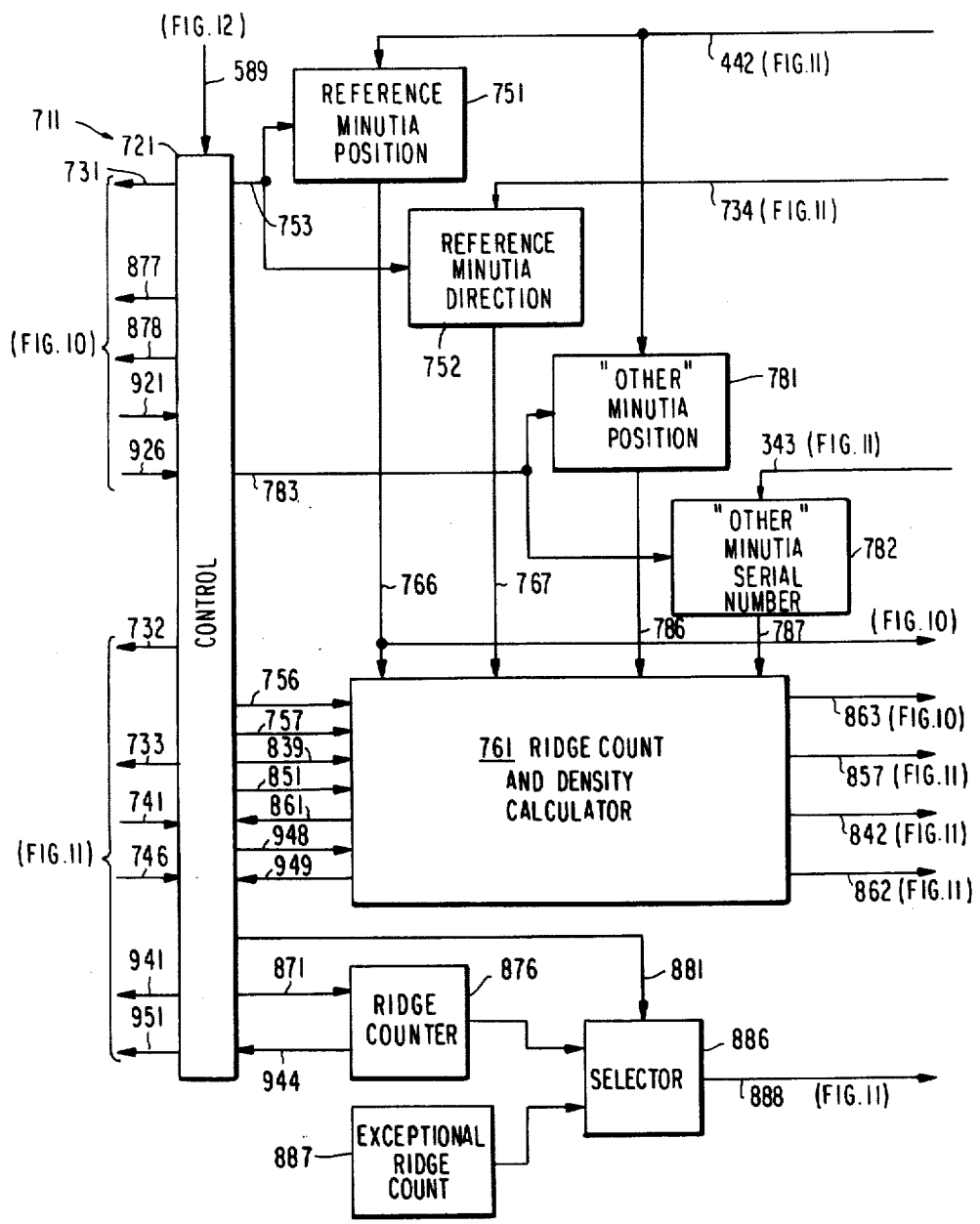
FIG. 15 is a block diagram of a relationship detecting unit for use in the device depicted in FIG. 1.

Referring to FIG. 1 once again and to FIG. 15 afresh, the relation detection start signal 589 puts a relationship detecting unit 711 into operation of calculating the ridge counts Wr's for each minutia 27 or 28 and the density C therefor in cooperation with the first and the second memory and control units 211 and 311. The relationship detecting unit 711 comprises a relation detection control circuit 721 that is energized by the start signal 589 and supplies the first memory and control unit 211 with a fifth mode signal 731 and the second memory and control unit 311 with a sixth mode signal 732 and then a reference minutia loop signal of a multiple loop signal sequence 733. As will shortly become clear, a plurality of "other" minutia loop signals follow the reference minutia loop signal of each multiple loop signal 733.

Turning temporarily back to FIG. 11, the sixth mode signal 732 energizes the control circuit 321 to make the first selector 346 select the first count signal at first and to produce the first reset signal 351 for the first counter 341. The feature memory 322 supplies the control circuit 321 with the flag output signal 441 representative of the minutia flag of a first-read minutia that now serve as a first one of the reference minutiae. The feature memory 322 also supplies the relationship detecting unit 711 with the position output signal 442 and a direction output signal 734 representative of the position and the direction of the reference minutia. Responsive to the reference minutia loop signal 733, the control circuit 321 checks the flag output signal 441 and supplies the relationship detecting unit 711 with a reference minutia strobe signal of a multiple strobe signal sequence 741 and a reference minutia status signal of a multiple status signal sequence 746. The reference minutia strobe signal is followed by a plurality of "other" minutia strobe signals in each multiple strobe signal 741. Likewise, the reference minutia status signal is followed by a plurality of "other" minutia status signals. The reference minutia status signal represents minutia read-out that is now for the reference minutia.

In FIG. 15, the relationship detecting unit 711 comprises reference minutia position and direction registers 751 and 752 supplied with the position and the direction output signals 442 and 734. When the reference minutia status signal 746 indicates minutia read-out, the control circuit 721 produces in response to the reference minutia strobe signal 741 a first register set signal 753 for setting the position and the direction output signals 442 and 734 in the respective registers 751 and 752. At the same time, the control circuit 721 renders a selector mode signal 756 on and supplies the same and a memory and counter reset signal 757 to a ridge count and density calculating circuit 761, which will later be described together with signals, such as 756 and 757, exchanged with the control circuit 721. Thereafter, the control circuit 721 produces a first one of the other minutia signals of the multiple loop signal 733. The reference minutia position and direction registers 751 and 752 produce reference minutia position and direction signals 766 and 767.

In FIG. 11, the first other minutia loop signal 733 makes the control circuit 321 produce a second reset signal 772 for resetting the second counter 342. Also, the control circuit 321 makes the first selector 346 select the second count signal 343, which is supplied to the feature memory 322 and also to the relationship detecting unit 711 as a serial number signal to be presently described. The feature memory 322 again supplies the flag output signal 441 back to the control circuit 321 and the position and the direction output signals 442 and 734 to the relationship detecting unit 711. The signals 441, 442, and 734 are those for the reference minutia for the time being. A comparator 773 compares the first and the second count signals and produces a comparison signal 774 representative of the result of comparison. When the comparison signal 774 indicates the same address of the feature memory 322, the control circuit 321 produces a second count-up signal 777 to count up the second counter 342. The second count signal, namely, the serial number signal 343, now represents an address for a first "other" minutia 27 or 28 that next follows the reference minutia in the scan of the streaked pattern 21. In the example being illustrated, the serial number signal 343 represents the serial numbers assigned to the minutiae in the order of scan. When the flag output signal 441 represents minutia read-out and furthermore when the comparison signal 774 indicates inequality, the control circuit 321 produces a first "other" minutia signal of each of the multiple strobe and status signals 741 and 746.

In FIG 15, the relationship detecting unit 711 comprises other minutia position and serial number registers 781 and 782 supplied with the position output signal 442 and the serial number signal 343. When the first other minutia status signal 746 indicates minutia read-out, the control circuit 721 produces a second register set signal 783 for setting the position output signal 442 and the serial number signal 343 in the respective registers 781 and 782. The registers 781 and 782 produce other minutia position and serial number signals 786 and 787.

Figure 16:
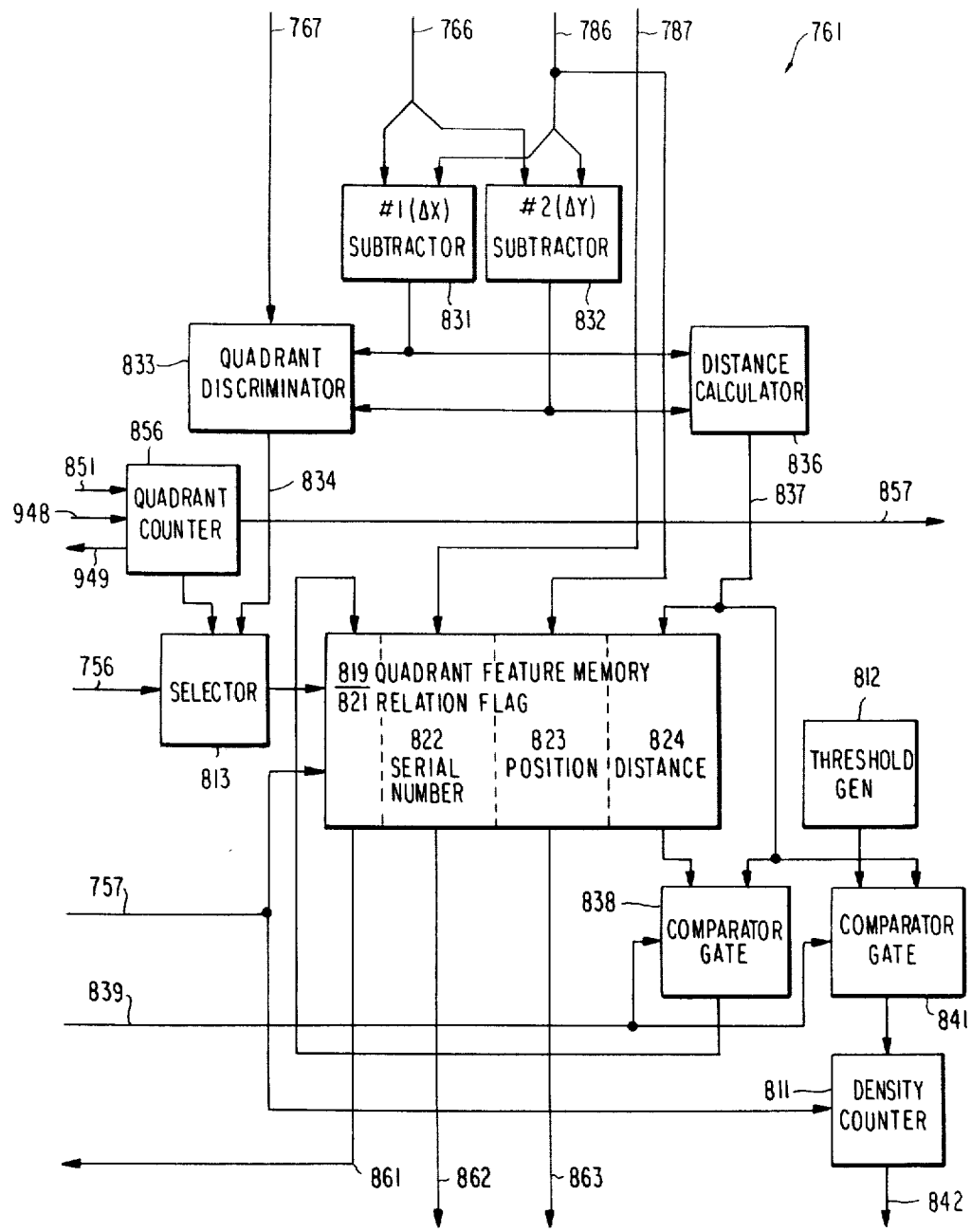
FIG. 16 is a block diagram of a ridge count and density calculating circuit for use in the relationship detecting unit illustrated in FIG. 15.

Referring now to FIG. 16 together with FIG. 15, the ridge count and density calculating circuit 761 comprises a density counter 811 and a threshold signal generator 812 to be described later and a selector 813 supplied with a first and a second selector input signal to be presently described, for producing the first and the second selector input signals when the selector mode signal 756 is rendered on and off, respectively. A quadrant feature memory 819 has relation flag, serial number, position, and distance areas 821, 822, 823, and 824 for storing a set of signals related to a reference minutia, such as $M_O$, at a time as will become clear as the description proceeds. The memory 819 has four addresses for the respective quadrants of the local coordinate system assigned to the reference minutia under consideration. The memory and counter reset signal 757 resets the ares 821 through 824 of all addresses into predetermined initial values. The initial values for each of the areas 821 through 824 may be a common initial value that will presently become clear. The reset signal 757 resets also the density counter 811. The threshold signal generator 812 produces a threshold signal indicative of a predetermined area for each reference minutia.

As soon as the position output signal 442 is registered in the other minutia position register 781, a first subtractor 831 supplied with the X components of the reference and the other minutia position signals 766 and 786, produces a first difference signal representative of an X component $\Delta X$ of a distance vector (FIG. 3) starting at the reference minutia, such as $M_O$, and ending at the other minutia. Responsive to the Y components of the signals 766 and 786, a second subtractor 832 produces a second difference signal representative of a Y component $\Delta Y$ of the distance vector. Supplied with the reference minutia direction signal 767 as a reference signal, a quadrant discriminator 833, to be described later more in detail, discriminates by the use of the first and the second difference signals that quadrant r of the local coordinate system in which the other minutia is present. The quadrant discriminator 833 supplies a quadrant signal 834 representative of the discriminated quadrant to the selector 813 as the first selector input signal. Responsive to the difference signals, a distance calculator 836 produces a distance signal 837 representative of a square of the distance between the reference and the other minutia $(\Delta X)^2+(\Delta Y)^2$.

A distance comparator gate 838 compares the distance signal 837 with the signal stored in the distance area 824 at an address specified by the quadrant signal 834 produced from the selector 813 biassed by the selector mode signal 756 that is already rendered on. The control circuit 721 produces a quadrant feature and count set signal 839 a short predetermined interval of time after production of each second register set signal 783. Only when the distance signal 837 represents a smaller square distance, the gate 838 supplies the set signal 839 to the quadrant feature memory 819 as a write signal. At the address indicated by the quadrant signal 834, the write signal stores an ON relation flag in the flag area 821, renews the content of the distance area 824 into the distance signal 837, and also renews the serial number and the position areas 822 and 823 with the serial number signal 787 and the other minutia position signal 786. The common initial value for the distance area 824 should therefore represent a sufficiently great square distance. When the distance signal 837 represents an equal or a longer distance, the initial values are retained in the quadrant feature memory 819 as they are.

Referring to FIGS. 11, 15, and 16, the relation detection control circuit 721 thereafter produces a second other minutia loop signal 733. The second control circuit 321 again produces the second count-up signal 777 to count up the second counter 342 one. The flag, position, direction serial number, and comparison signals 441, 442, 734, 343, and 774 for the second other minutia, second other minutia signals of the multiple strobe and status signals 741 and 746, the second register set signal 783, the other minutia position and serial number signals 786 and 787, and the quadrant feature and count set signal 839 are again produced. In the meantime, the reference minutia position and direction signals 766 and 767 are kept as they are. The relation flag, serial number, position, and distance areas 821 through 824 of the quadrant feature memory 819 are renewed only when the distance signal 837 is less than the content of the distance area 824.

In the meanwhile, a threshold comparator gate 841 compares the distance signals 837 successively produced for the other minutiae related to the reference minutia being dealt with, with the threshold distance signal and lets the quadrant feature and count set signal 839 pass therethrough only when the other minutiae are within the predetermined area. The gated set signals are successively counted by the density counter 811.

When the flag output signal 441 produced for the reference minutia being dealt with eventually becomes the minutia flag end code, the second control circuit 321 switches the first selection signal to make the first selector 346 select the first count signal in preparation for storage of the density C and the ridge counts Wr's for the reference minutia and for the respective quadrants in the feature memory 322. Furthermore, the control circuit 321 makes the multiple status signal 746 indicate completion of minutia read-out and produces a final strobe signal of the multiple strobe signal 741. At this moment, the four addresses of the areas 821 through 824 are loaded with the ON flags and the serial numbers, position, and square distances of the related minutiae, such as Mr, that are nearest to the reference minutia in the respective quadrants. If there is no related minutia in a certain quadrant, the initial values are retained in the areas 821 through 824 at the address for that quadrant. The density counter 811 produces a density signal 842 representative of the density C for the reference minutia under consideration.

In response to the multiple status signal 746 indicative of completion of minutia read-out, the relation detection control circuit 721 turns the selector mode signal 756 off and produces a quadrant count reset signal 851 for resetting a quadrant counter 856 to an initial count. Let the initial count be indicative of the first quadrant of the local coordinate system assigned to the reference minutia being dealt with. Responsive to a quadrant count signal 857 produced by the quadrant counter 856 and selected by the selector 813, the relation flag, serial number, and position areas 821, 822, and 823 of the quadrant feature memory 819 produce relation flag output, serial number output, and related minutia position signals 861, 862, and 863 from the address for the first quadrant. The quadrant count signal 857 is supplied also to the feature memory 322, to which the density signal 842 and the serial number output signal 862 are also supplied. The position output signal 863 is supplied to the first memory and control unit 211.

In FIG. 15, the control circuit 721 furthermore produces a rige count reset signal 871 for setting an initial value in a ridge counter 876 and checks the relation flag output signal 861. When the check indicates that the flag output signal 861 for the quadrant specified by the quadrant counter 856 shows the ON flag, the control circuit 821 produces an inter-unit set signal 877 and a trace signal 878 for putting the first memory and control unit 211 into operation of tracing the transverse vector for that quadrant and each skelton in the manner to be later described. When the flag output signal 861 indicates the initial value of the flag area 821 (FIG. 16) for the specified quadrant, the control circuit 721 turns a ridge count selection signal 881 on to make a ridge count selector 886 select an exceptional ridge count signal produced by an exceptional ridge count code generator 887 and supply the selected code signal as a ridge count signal 888 to the second memory and control unit 311.

Figure 17:
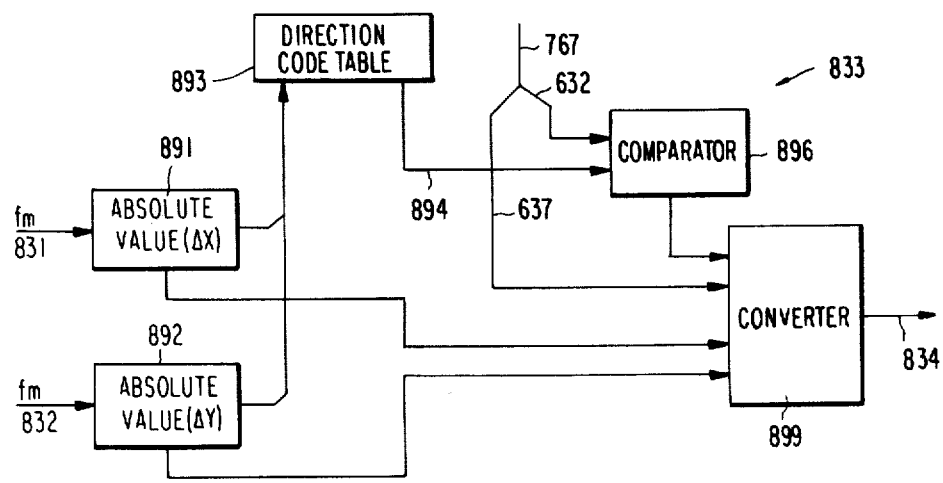
FIG. 17 is a block diagram of a quadrant discriminator for use in the ridge count and density calculating circuit shown in FIG. 15.

Referring now to FIG. 17 for a short while, an example of the quadrant discriminator 833 comprises first and second absolute value calculators 891 and 892 responsive to the first and the second difference signals representative of the X and the Y components of the distance vector $\Delta X$ and $\Delta Y$ for producing first and second absolute value signals. With reference to the absolute value signals representative of an angle in the first quadrant of an X'-Y' coordinate system of the type described above, a direction code table 893 produces a direction code signal 894 representative of a code vector for the distance vector. As described hereinabove, the reference minutia direction signal 767 is a direction output signal 734 produced from the direction area 333 of the feature memory 322 (FIG. 12) and comprises a similar direction code signal 632 and a quadrant code signal 637 (FIG. 14). A comparator 896 is for comparing the direction code signals 894 and 632 to produce a difference signal representative of that side of the direction vector on which the distance vector is present. The quadrant signal 834 is now produced by a converter 899 responsive to the difference signal, the quadrant code signal 637 (two bits), and the sign bits of the first and the second difference signals. Incidentally, it is readily feasible to implement the distance calculator 836 (FIG. 16) by a combination of two multipliers and an adder. Each multiplier may be substituted for by a conversion table for converting, for example, the X component of the distance vector $\Delta X$ to a square thereof $(\Delta X)^2$.

Referring back to FIG. 10, the third mode signal 731 makes the control circuit 221 give the trace mode signal 471 a relation detection mode. Responsive to the inter-unit set signal 877, the control circuit 221 supplies a vector set signal 911 to a vector generator 915 to make the same hold the reference and the related minutia position signals 766 and 863 already supplied thereto from the relationship detecting unit 711. The vector generator 915 may be of the type disclosed by Arakawa-Takesi, assignor to the present assignee, in Japanese Patent Pre-Publication No. Syo 52-108739 (Japanese Patent Application No. Syo 51-25221) and produces a reference point signal 916 representative of the reference minutia position under consideration, a related point signal 917 representative of the related minutia position, and a vector step signal 918 representative at first of the reference minutia position.

Furthermore, the control circuit 221 gives the selection signal another level for making the selector 224 select the vector step signal 918, produces the preset signal 225 for setting the vector step signal 918 in the two-dimensional position counter 226 and for making the local address signal 231 represent the reference minutia position at first, and is thereafter rendered capable of examining the word flags 238 of the word class signal sequence 237 supplied from the feature table 236 in response to the matrix word signals produced by the skelton memory 222 from the addresses specified by the local address signals 231.

Immediately thereafter, the control circuit 221 produces a step next signal 919 and then the preset signal 225. Responsive to the next signal 919, the vector generator 915 makes the vector step signal 918 represent a step position that is the next skelton point towards the related minutia position along the transverse vector. Insofar as the word flag 238 indicates that the step position is a white point, the control circuit 221 produces the next signals 919 in succession together with the preset signals 225. Thus controlled by the vector generator 915 among others, the position counter 226 successively produces the local address signals 231 to trace the transverse vector from the reference minutia under consideration towards that one of the related minutiae which is present in the quadrant specified by the quadrant count signal 857 (FIGS. 15 and 16).

In response to the trace signal 878, the control circuit 221 supplies the relationship detecting unit 711 with a strobe signal 921 and an inter-unit trace status signal 926 indicative of improper step position when the word flag 238 is found to represent either a singular point 45 or a skelton point in the accompanying region. The control circuit 221 suspends production of the step next signal 919 and the preset signal 225 when the word flag 238 indicates one of an ending 27, bifurcation 28, general ridge point 46, and contiguous point. Instead, the control circuit 221 supplies the trace start signal 472 to the tracing circuit 511 and makes the selector 224 select the output signal 577 of the tracing circuit 511. The status signal 926 produced together with the strobe signal 921 is made to indicate skelton intersection detection and completion of vector tracing only in cases that will be described later.

In FIGS. 10 and 13, the tracing circuit 511 begins tracing the skelton under the control of the trace mode signal 471 indicative of the relation detection mode as generally described with reference to FIGS. 6 through 8. Operation is similar to that described in connection with the direction detection mode. The trace control circuit 521, however, immediately checks the word flag 238 examined by the first control circuit 221. When the word flag 238 represents a general ridge point 46, the point 46 is regarded as a newly rechaed point of intersection, such as P. When the word flag 238 indicates a contiguous point, the trace control circuit 521 produces the shift-set signals 533 and 534 and the counter set signal 539 to make the position counter 226 step according to that one of the branch codes of the branch code signal 239 comprised by the word class signal 237 together with the word flag 238 in question, which is moved to the prior branch code register 524. The local address signal 231 now indicates general ridge point 46, which is now regerded as a newly reached point of intersection.

When a point of intercetion is thus newly found, the tracing circuit 511 traces the skelton with the branch memory 526 loaded with the local address signal 231 representative of the point of intersection and one of the branche codes for the newly reached point of intersection, namely, the general ridge point 46, that is not moved to the prior branch code register 524 but left in the output stage of the branch code shift register 523. As will presently be described, the address and the stop counters 527 and 529 are counted up by count-up signals 927 and 929 produced by the control circuit 521 either when the skelton is fully traced the preselected arcuate length in both senses or when a particular point mentioned in connection with FIGS. 6 through 8, namely, one of the reference and the related minutiae or any one of the point or points of intersection found up to present, is reached during the skelton tracing in either sense. The branch memory 526 is thereby loaded with successive found points of intersection.

At any rate, first and second position comparators 931 and 932 compares the reference and the related point signals 916 and 197 with the local address signals 231 successively renewed during the skelton tracing by the branch codes supplied to the position counter 226 through the connection 541. A third position comparator 933 compares each local address signal 231 with the output signals 577 of the branch memory 526 for the successively found points of intersection. For this purpose, the address counter 527 is once reset and counted up. During the count-up, a count comparator 934 compares the increasing count of the address counter 527 with the count held in the stop counter 529 and stops production of the output signal 577 when the count in the address counter 527 becomes equal to that in the stop counter 529.

As soon as any one of the position comparators 931 through 933 indicates that a particular point is reached, the the trace control circuit 521 makes the local trace status signal 551 indicate arrival at particular point and supplies the above-mentioned count-up signals 927 and 929 to the address and the stop counters 527 and 529. This is for preventing the point of intersection retained in the branch memory 526 from being damaged when another point of intersection is next subsequently reached. Responsive to the local trace status signal 551, the first control circuit 521 makes the inter-unit trace status signal 926 represent arrival at particular point and restarts production of the step next signal 919 and the preset signal 225 and makes the selector 224 select the vector step signal 918, without producing the strobe signal 921.

When the skelton tracing is contiued to the preselected arcuate length with no particular point reached, the trace control circuit 521 makes the first control circuit 221 produce the trace next signal 576. The same skelton is traced in the opposite sense indicated by the branch code stored in the branch memory 526 for the poind of intersection being dealt with, from the point of intersection retained also in the branch memory 526. When the skelton is again fully traced in the opposite sense, the trace control circuit 521 makes the local address signal 551 indicate completion of skelton tracing and again produces the above-mentioned count-up signals 297 and 929. Responsive to the local trace status signal 551, the first control circuit 221 makes the vector generator 915 step further and produces the strobe signal 921 together with the inter-unit trace status signal 926 indicative of skelton intersection detection mentioned above.

As soon as the step position eventually coincides with the related minutia position, the vector generator 915 produces an end of vector signal 936. The first control circuit 221 makes the trace status signal 926 indicate completion of vector tracing, mentioned above, and produces the strobe signal 921. The second position comparator 932 also indicates arrival at the related minutia position. The word flag 238 checked by the first and the trace control circuits 221 and 521 indicates ether an ending 27 or a bifurcation 28, namely, the related minutia.

In FIG. 15, the control circuit 721 turns the ridge count selection signal 881 on in response to the strobe signal 921 when the inter-unit trace status signal 926 indicates improper step point. The ridge count signal 888 is made to represent the exceptional ridge count for the quadrant specified by the quadrant count signal 857 as is the case where the relation flag output signal 861 indicates the initial value for the quadrant under consideration. Also, the control circuit 721 produces an inter-unit relationship write signal 941.

Each time when the trace status signal 926 indicates skelton intersection detection, the control circuit 721 produces a count-up signal 944 in response to the strobe signal 921 to make the ridge counter 876 count the examined number of points of intersection. When the trace status signal 926 eventually indicates completion of vector tracing, the control circuit 721 produces the relationship write signal 941 in response to the strobe signal 921. The ridge count signal 888 represents the inter-minutia ridge count for the related minutia in the quadrant being dealt with.

In FIG. 11, the control circuit 321 produces a local relationship write signal 946 in response to the inter-unit relationship write signal 941. At the address indicated by the first counter 341, the ridge count signal 888 representative of either of the inter-minutia ridge count and the exceptional ridge count and the serial number output signal 862 are written in one of the relationship areas 336 through 339 of the feature memory 322 that is specified by the quadrant count signal 857.

In FIGS. 15 and 16, the control circuit 721 subsequently produces a count-up signal 948 for counting up the quadrant counter 856 and supplies the first memory and control unit 211 again with the inter-unit set signal 877 and the trace signal 878. Detection and examination of the skelton intersections and storage of the relationships are repeated for the quadrants successively indicated by the quadrant count signals 856 among the four quadrants of the local coordinate system assigned to the reference minutia under consideration. The quadrant counter 856 produces a quadrant count end signal 949 when counted up to four. After the detection, examination, and storage for the fourth quadrant is completed, the control circuit 721 produces an inter-unit density write signal 951.

In FIGS. 11 and 15, the second control circuit 321 produces a local density write signal 956. The density signal 842 held in the density counter 811 (FIG. 16) up till now, is written in the density area 334 of the feature memory 322 at the address for the reference minutia being dealt with. The relation detection control circuit 721 produces another multiple loop signal of the sequence 733. The second control circuit 321 produces the first count-up signal 356 to count up the first counter 341 for a next following minutia that now serves as a new reference minutia. Operation of finding related minutiae for the new reference minutia, detection of relationships and calculation of the density, and storage of the relationships and the density in the feature memory 322 at the address for the new reference minutia are repeated. Upun finding that the minutia flag output signal 441 produced in response to the count up of the first counter 341 eventually represents the minutia flag end code, the second control circuit 321 produces the strobe signal 746 together with the inter-unit minutia status signal 746 indicative of completion of minutia read-out, which means that all minutiae stored in the feature memory 322 are used as the reference minutiae. The relation detection control circuit 721 turns the mode signals 731 and 732 off. All pattern features are now detected and stored in the feature memory 322.

It will now be understood that the control circuits 121, 221, 321, 421, 521, and 721 are readily implemented from the description so far made. In FIG. 10, it is possible to make the two-dimensional position counter 226 produce a full count signal 959 to stop operation of the device should any count set or stepped therein tends to exceed the addresses of the skelton memory 222. Instead of each direction code table 631 (FIG. 14) or 893 (FIG. 17), it is possible to use a known combination of wired logics. Although is is sufficient that the window shift register 128 (FIG. 9) have shift register stages for a matrix of 3×3 elements, the number of elements of such a matrix may be varied so that each skelton word may comprise skelton points in a preselected area that is adjacent to and surrounds each center skelton point in the skelton pattern. The memories 222 and 322 may be utilized by resorting to the known blocking technique. As associative memory is useful. It is also possible to modify the timing of production of various inter-unit signals so as, for example, to start calculation of relationship detection while the direction detection is in progress.

While this invention has thus far been described in conjunction with a preferred embodiment thereof together with several modifications, it will now be readily possible for those skilled in the art to carry this invention into effect by the use of a device according to any one of various other embodiments of this invention or modification thereof. For example, the relationships may be calculated with the skelton pattern divided into a prescribed number of divisions related to the reference feature point under consideration. This applies to the predetermined area for detecting the density.

When the skelton pattern should be divided in relation to the direction of each feature point, either equally or unequally according to a predetermined rule, into a plurality of sectors that have a common vertex at the reference feature point and serve as the prescribed number of divisions, the direction code table 893 and the converter 899 (FIG. 17) should be modified accordingly. It is also necessary to modify the quadrant counter 856 (FIG. 16) together with the relationship areas 336 through 339 (FIG. 11).

Examples of the density or concentration other than the number of feature points in a predetermined area adjacent to and surrounding each reference feature point in the skelton pattern, are a sum of the distances between the reference feature point and the adjacent feature points, another sum of the square distances calculated by the distance calculator 836 (FIG. 16), and a sum of quantities related to such distances. It is possible to define the density by a total sum of any other quantities that are variable in relation to the distance from each reference feature point in a predetermined area.

It is also possible to make the skelton memory 222 (FIG. 10) memorize each skelton signal representative of the results of discrimination between the point on the skelton and the point in the inter-skelton area and between the points in the objective and the accompanying regions. It is, however, necessary in this event to make the two-dimensional position counter 226 produce the local address signal 231 for each skelton point with the address varied plus and minus one for the eight surrounding skelton points. The number of elements of such a matrix may be varied from 3×3 and may be different for the feature point detection and for the direction calculation.

What is claimed is:

1. A device for extracting pattern features from a streaked pattern having a multiplicity of streaks at least on a fragmentary area thereof, a first plurality of streaks of said multiplicity of streaks having a second plurality of feature points having at least one predetermined relationship to said first plurality of streaks, said device comprising means for two-dimensionally scanning said streaked pattern in synchronism with a timing signal sequence to produce a sequence of picture element signals representative of said streaked pattern, means responsive to said picture element and said timing signal sequences for thinning said multiplicity of streaks generally to skeltons with a background area interposed between two adjacent skeltons to thereby convert said streaked pattern to a skelton pattern comprising skelton points representative of said skeltons and the background areas and to produce a sequence of skelton signals representative of the respective skelton points, feature point extracting and position detecting means responsive to said skelton and said timing signal sequences for extracting said feature points from said skelton points and for detecting positions of the extracted feature points in said skelton pattern, by the use of a skelton signal representative of each skelton point and with reference to the skelton signals representative of the skelton points in that first preselected area of said skelton pattern which is contiguous to and surrounds said each skelton point, to thereby produce a sequence of skelton signals representative of the detected positions, respectively, direction detecting means responsive to said position and said skelton signal sequences for detecting directions defined for the extracted feature points in relation to the skeltons into which said first plurality of streaks are thinned, by the use of a position signal representative of the position of each extracted feature point and with reference to the skelton signals representative of the skelton points in that second preselected area of said skelton pattern which is contiguous to and surrounds in said skelton pattern the skelton point extracted as said each extracted feature point, to thereby produce a sequence of direction signals representative of the detected direction, respectively, and relationship detecting means responsive to said position and said direction signal sequences for detecting a density for each extracted feature point selected as a reference feature point and a plurality of counts for said reference feature point, said density being determined by those of said extracted feature points which have positions in a predetermined area contiguous to and surrounding the position of said reference feature point and are selected as adjacent feature points, each count being related to the number of skeltons intervening between said reference feature point and a related feature point that is nearest to said reference feature point of the extracted feature points having positions in each of a prescribed number of divisions of said skelton pattern, whereby the detected positions, the detected directions, the densities detected for the respective reference feature points, and the counts detected as relationships for the respective reference feature points are extracted as said pattern features.

2. A device as claimed in claim 1, further comprising a skelton memory for memorizing said skelton signal sequence in relation to the respective skelton points, means for supplying said feature point extracting and position detecting means with the skelton signal memorized in said skelton memory in relation to said each skelton point and the skelton signals memorized in said skelton memory in relation to the skelton points in said first preselected area, a feature memory for memorizing at least said position signal sequence in relation to the extracted feature points, respectively, means for supplying said direction detecting means with the position signal memorized in said feature memory in relation to said each extracted feature point and with the skelton signals memorized in said skelton memory in relation to the skelton points in said second preselected area, means for making said feature memory memorize said direction signal sequence in relation to the extracted feature points for which said directions are detected, respectively, and means for supplying said relationship detecting means with a position and a direction signal memorized in said feature memory in relation to said reference feature point, the position and the direction signals memorized in said feature memory in relation to the extracted feature points in said predetermined area, and the position and the direction signals memorized in said feature memory in relation to the extracted feature points in each of said divisions.

3. A device as claimed in claim 1 or 2, wherein said relationship detecting means comprises first means for dividing said skelton pattern into a plurality of sectors having a common vertex at each reference feature point, said sectors being equal in number to said prescribed number, and second means for deciding the related feature point in each sector.

4. A device as claimed in claim 1 or 2, wherein said relationship detecting means comprises means for counting the number of adjacent feature points as said density.

5. A device as claimed in claim 1 or 2, wherein said relationship detecting means comprises means for calculating a total sum of quantities variable in said predetermined area with the distance from each reference feature point.

* * * * *